(12) United States Patent
Kessler et al.

(10) Patent No.: US 10,642,361 B2
(45) Date of Patent: May 5, 2020

(54) HAPTIC ELECTROMAGNETIC ACTUATOR

(71) Applicant: Apple Inc., Cupertino, CA (US)

(72) Inventors: Patrick Kessler, San Francisco, CA (US); Dhaval Chandrakant Patel, San Jose, CA (US); Jonah A. Harley, Los Gatos, CA (US); Brett W. Degner, Menlo Park, CA (US); Nicholas Alan Rundle, San Jose, CA (US); Peteris K. Augenbergs, Woodside, CA (US); Nicholaus Lubinski, San Francisco, CA (US); Kenneth L Staton, San Carlos, CA (US); Omar Sze Leung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 15/797,992

(22) Filed: Oct. 30, 2017

(65) Prior Publication Data

US 2018/0120940 A1 May 3, 2018

Related U.S. Application Data

(62) Division of application No. 14/404,156, filed as application No. PCT/US2013/045011 on Jun. 10, 2013, now abandoned.
(Continued)

(51) Int. Cl.
*H01F 5/00* (2006.01)
*G06F 3/01* (2006.01)
(Continued)

(52) U.S. Cl.
CPC .......... *G06F 3/016* (2013.01); *G06F 3/03547* (2013.01); *G06F 3/0414* (2013.01);
(Continued)

(58) Field of Classification Search
CPC ........ G06F 3/016; G06F 3/04; H01F 41/0612; H01F 41/02; H03K 17/97
(Continued)

(56) References Cited

U.S. PATENT DOCUMENTS 3,176,241 A * 3/1965 Hogan .................. H03K 17/97
331/75
4,423,640 A 1/1984 Jetter
(Continued)

FOREIGN PATENT DOCUMENTS

| CN | 1659583 | 8/2005 |
|---|---|---|
| CN | 101477422 A | 7/2009 |

(Continued)

OTHER PUBLICATIONS

U.S. Appl. No. 15/791,618, filed Oct. 24, 2017, Wells et al.
(Continued)

*Primary Examiner* — Shawki S Ismail
*Assistant Examiner* — Lisa N Homza
(74) *Attorney, Agent, or Firm* — Brownstein Hyatt Farber Schreck, LLP

(57) ABSTRACT

A haptic electromagnetic actuator for track pad is provided. The actuator includes an array of electromagnets with alternating South and North poles on a first end, each magnet comprising a metal core and an electrical wire around the metal core. The array of magnets is coupled to a base plate on a second end opposite to the first end. The actuator also includes an attraction plate at a distance from the first end of the array of the magnets such that the attraction plate moves toward the magnets when an electrical current flows through the electrical wire around the metal core and moves away from the magnets when the current becomes zero. The array of magnets is configured to form a uniform gap from the attraction plate.

20 Claims, 12 Drawing Sheets

Related U.S. Application Data

(60) Provisional application No. 61/800,092, filed on Mar. 15, 2013, provisional application No. 61/658,764, filed on Jun. 12, 2012.

(51) Int. Cl.
  *H01F 7/16* (2006.01)
  *H01F 41/064* (2016.01)
  *G06F 3/041* (2006.01)
  *G06F 3/0354* (2013.01)
  *H01F 41/02* (2006.01)

(52) U.S. Cl.
  CPC ......... *H01F 7/1638* (2013.01); *H01F 7/1653* (2013.01); *H01F 41/02* (2013.01); *H01F 41/064* (2016.01); *Y10T 29/49071* (2015.01)

(58) Field of Classification Search
  USPC ........................................................ 335/266
  See application file for complete search history.

(56) References Cited

U.S. PATENT DOCUMENTS

| | | | |
|---|---|---|---|
| 4,558,757 A | 12/1985 | Mori | |
| 4,577,174 A | 3/1986 | Lemmer | |
| 4,716,393 A * | 12/1987 | Logie | H01F 7/1638 335/261 |
| 4,897,582 A | 1/1990 | Otten et al. | |
| 5,052,844 A | 10/1991 | Kendall | |
| 5,103,404 A | 4/1992 | McIntosh | |
| 5,231,336 A | 7/1993 | van Namen | |
| 5,541,372 A | 7/1996 | Bailer et al. | |
| 5,734,373 A | 3/1998 | Rosenberg | |
| 5,805,138 A | 9/1998 | Brawne | |
| 5,999,168 A | 12/1999 | Rosenberg et al. | |
| 6,100,874 A | 8/2000 | Schena et al. | |
| 6,219,038 B1 | 4/2001 | Cho | |
| 6,337,678 B1 | 1/2002 | Fish | |
| 6,373,465 B2 | 4/2002 | Jolly | |
| 6,388,655 B1 | 5/2002 | Leung | |
| 6,492,979 B1 | 12/2002 | Kent | |
| 6,518,954 B1 | 2/2003 | Chen | |
| 6,747,631 B1 | 6/2004 | Sakamaki | |
| 6,816,049 B2 * | 11/2004 | Watanabe | G06F 3/016 335/222 |
| 6,937,124 B1 * | 8/2005 | Nakamura | H01H 13/85 335/222 |
| 6,940,494 B2 | 9/2005 | Hoshino et al. | |
| 7,031,592 B2 * | 4/2006 | Akieda | G06F 3/0354 345/156 |
| 7,044,681 B2 | 5/2006 | Quenzi et al. | |
| 7,091,886 B2 | 8/2006 | DePue | |
| 7,152,482 B2 | 12/2006 | Ueno | |
| 7,176,897 B2 | 2/2007 | Roberts | |
| 7,219,549 B2 | 5/2007 | Honkura et al. | |
| 7,245,293 B2 | 7/2007 | Hoshino et al. | |
| 7,283,120 B2 | 10/2007 | Grant | |
| 7,331,245 B2 | 2/2008 | Nishimura | |
| 7,436,396 B2 | 10/2008 | Akieda | |
| 7,443,384 B2 * | 10/2008 | Harada | G06F 3/016 178/18.01 |
| 7,511,706 B2 | 3/2009 | Schena | |
| 7,525,532 B2 | 4/2009 | Liu et al. | |
| 7,532,202 B2 | 5/2009 | Roberts | |
| 7,557,051 B2 | 7/2009 | Ryu | |
| 7,567,232 B2 * | 7/2009 | Rosenberg | G06F 3/016 345/156 |
| 7,639,232 B2 | 12/2009 | Grant et al. | |
| 7,656,388 B2 | 2/2010 | Schena et al. | |
| 7,656,393 B2 | 2/2010 | King | |
| 7,685,538 B2 | 3/2010 | Fleck et al. | |
| 7,692,078 B2 | 4/2010 | Hayashi | |
| 7,710,397 B2 | 5/2010 | Krah et al. | |
| 7,791,506 B2 * | 9/2010 | Riihimaki | G06F 3/0202 200/19.36 |
| 7,791,588 B2 | 9/2010 | Tierling et al. | |
| 7,825,903 B2 | 11/2010 | Anastas et al. | |
| 7,843,277 B2 | 11/2010 | Gregorio et al. | |
| 7,877,707 B2 | 1/2011 | Westerman | |
| 7,920,225 B2 | 4/2011 | Nishikawa et al. | |
| 7,920,694 B2 | 4/2011 | Cruz-Hernandez et al. | |
| 7,924,145 B2 | 4/2011 | Yuk | |
| 7,948,337 B2 | 5/2011 | Chu | |
| 7,952,566 B2 | 5/2011 | Poupyrev | |
| 8,013,961 B2 | 9/2011 | Adachi et al. | |
| 8,059,104 B2 | 11/2011 | Shahoian et al. | |
| 8,059,105 B2 | 11/2011 | Rosenberg | |
| 8,081,156 B2 | 12/2011 | Ruettiger | |
| 8,084,968 B2 | 12/2011 | Murray et al. | |
| 8,117,912 B2 | 2/2012 | Kawakubo | |
| 8,132,468 B2 | 3/2012 | Radivojevic | |
| 8,139,038 B2 | 3/2012 | Chueh | |
| 8,144,129 B2 | 3/2012 | Hotelling | |
| 8,169,332 B2 | 5/2012 | Son | |
| 8,169,401 B2 | 5/2012 | Hardwick | |
| 8,169,402 B2 | 5/2012 | Shahoian et al. | |
| 8,232,969 B2 | 7/2012 | Grant | |
| 8,252,695 B2 | 8/2012 | Tan | |
| 8,259,066 B2 | 9/2012 | Cheng et al. | |
| 8,260,337 B2 | 9/2012 | Periyalwar et al. | |
| 8,264,465 B2 | 9/2012 | Grant et al. | |
| 8,279,175 B2 | 10/2012 | Kim et al. | |
| 8,287,522 B2 | 10/2012 | Moses et al. | |
| 8,291,776 B1 | 10/2012 | Pickens | |
| 8,296,670 B2 | 10/2012 | Matthews et al. | |
| 8,310,350 B2 | 11/2012 | Pfau et al. | |
| 8,310,444 B2 | 11/2012 | Peterson et al. | |
| 8,310,452 B2 | 11/2012 | Takenaka et al. | |
| 8,315,834 B2 | 11/2012 | Gimelfarb et al. | |
| 8,319,727 B2 | 11/2012 | Norieda | |
| 8,373,664 B2 | 2/2013 | Wright | |
| 8,378,798 B2 | 2/2013 | Bells et al. | |
| 8,378,965 B2 | 2/2013 | Gregorio et al. | |
| 8,400,410 B2 * | 3/2013 | Taylor | G06F 3/016 345/173 |
| 8,421,567 B2 | 4/2013 | Eckl et al. | |
| 8,466,889 B2 | 6/2013 | Tong et al. | |
| 8,482,381 B2 | 7/2013 | Chatterjee et al. | |
| 8,487,759 B2 | 7/2013 | Hill | |
| 8,488,308 B2 | 7/2013 | Ng et al. | |
| 8,502,547 B2 | 8/2013 | Philipp | |
| 8,525,778 B2 | 9/2013 | Colgate et al. | |
| 8,536,978 B2 | 9/2013 | Coggill | |
| 8,570,162 B2 | 10/2013 | Ujii | |
| 8,570,297 B2 | 10/2013 | Bulea | |
| 8,581,901 B2 | 11/2013 | Joshi | |
| 8,587,542 B2 | 11/2013 | Moore | |
| 8,593,409 B1 | 11/2013 | Heubel | |
| 8,610,684 B2 | 12/2013 | Kalu et al. | |
| 8,633,901 B2 | 1/2014 | Orr et al. | |
| 8,633,911 B2 | 1/2014 | Schediwy et al. | |
| 8,633,916 B2 | 1/2014 | Bernstein et al. | |
| 8,648,816 B2 | 2/2014 | Homma et al. | |
| 8,671,782 B2 | 3/2014 | Mink | |
| 8,686,839 B2 | 4/2014 | Posamentier | |
| 8,686,961 B2 | 4/2014 | Yamano | |
| 8,717,152 B2 | 5/2014 | Bhatia et al. | |
| 8,730,199 B2 | 5/2014 | Sleeman et al. | |
| 8,760,669 B2 | 6/2014 | Heath et al. | |
| 8,783,106 B1 | 7/2014 | Nielson et al. | |
| 8,799,827 B2 | 8/2014 | Hinckley et al. | |
| 8,810,522 B2 | 8/2014 | Tse | |
| 8,830,188 B2 | 9/2014 | Verthein et al. | |
| 8,836,648 B2 | 9/2014 | Wilairat | |
| 8,854,317 B2 | 10/2014 | Homma et al. | |
| 8,884,892 B2 | 11/2014 | Bakker | |
| 8,898,564 B2 | 11/2014 | Grant | |
| 8,901,783 B2 | 12/2014 | Gregory et al. | |
| 8,907,661 B2 * | 12/2014 | Maier | G06F 3/03548 324/207.11 |
| 8,915,422 B1 | 12/2014 | Harty | |
| 8,937,603 B2 | 1/2015 | Flanagan et al. | |

(56) References Cited

U.S. PATENT DOCUMENTS

| | | |
|---|---|---|
| 8,976,537 B2 | 3/2015 | Ito |
| 8,982,051 B2 | 3/2015 | Rosenfeld et al. |
| 9,001,060 B2 | 4/2015 | Harris |
| 9,013,405 B2 | 4/2015 | Kujawski et al. |
| 9,013,430 B2 | 4/2015 | McCann |
| 9,024,907 B2 | 5/2015 | Bolender |
| 9,030,306 B2 | 5/2015 | Lim et al. |
| 9,030,419 B1 | 5/2015 | Freed |
| 9,054,627 B2 | 6/2015 | Garg et al. |
| 9,086,740 B2 | 7/2015 | Furukawa |
| 9,110,532 B2 | 8/2015 | Ando et al. |
| 9,111,424 B2 | 8/2015 | Lim et al. |
| 9,120,009 B2 | 9/2015 | Bae et al. |
| 9,122,325 B2 | 9/2015 | Peshkin |
| 9,122,345 B2 | 9/2015 | Chen |
| 9,128,523 B2 | 9/2015 | Buuck |
| 9,148,190 B1 | 9/2015 | Buuck et al. |
| 9,158,407 B2 | 10/2015 | Coulson et al. |
| 9,164,605 B1 | 10/2015 | Pirogov |
| 9,182,859 B2 | 11/2015 | Coulson et al. |
| 9,207,801 B2 | 12/2015 | Schediwy et al. |
| 9,222,693 B2 | 12/2015 | Gourlay |
| 9,223,471 B2 | 12/2015 | Buxton |
| 9,262,002 B2 | 2/2016 | Momeyer et al. |
| 9,274,682 B2 | 3/2016 | Hinckley et al. |
| 9,282,893 B2 | 3/2016 | Longinotti-Buitoni et al. |
| 9,298,260 B2 | 3/2016 | Karaoguz |
| 9,304,587 B2 | 4/2016 | Wright et al. |
| 9,348,473 B2 | 5/2016 | Ando |
| 9,349,552 B2 | 5/2016 | Huska |
| 9,360,968 B2 | 6/2016 | Wright |
| 9,372,543 B2 | 6/2016 | Lo et al. |
| 9,389,686 B2 | 7/2016 | Zoller |
| 9,389,688 B2 | 7/2016 | Tossavainen et al. |
| 9,417,695 B2 | 8/2016 | Griffin et al. |
| 9,448,626 B2 | 9/2016 | Cruz-Hernandez et al. |
| 9,449,476 B2 | 9/2016 | Lynn et al. |
| 9,454,256 B2 | 9/2016 | Fisher et al. |
| 9,477,342 B2 | 10/2016 | Daverman et al. |
| 9,772,688 B2 | 9/2017 | Patel et al. |
| 9,798,409 B1 | 10/2017 | Wells et al. |
| 10,297,119 B1 | 5/2019 | Bard et al. |
| 2004/0080494 A1 | 4/2004 | Fahlman |
| 2006/0109254 A1* | 5/2006 | Akieda ............ G06F 3/016 345/173 |
| 2007/0152966 A1 | 7/2007 | Krah et al. |
| 2008/0018611 A1 | 1/2008 | Serban et al. |
| 2008/0068343 A1 | 3/2008 | Hoshino et al. |
| 2008/0084384 A1 | 4/2008 | Gregorio et al. |
| 2008/0111791 A1 | 5/2008 | Nikittin |
| 2008/0165159 A1 | 7/2008 | Soss et al. |
| 2008/0191648 A1 | 8/2008 | Ito et al. |
| 2008/0297289 A1* | 12/2008 | Chu ............ G11B 9/1481 335/259 |
| 2008/0297478 A1 | 12/2008 | Hotelling et al. |
| 2009/0002199 A1 | 1/2009 | Lainonen et al. |
| 2009/0027038 A1 | 1/2009 | Garmire et al. |
| 2009/0102805 A1 | 4/2009 | Meijer et al. |
| 2009/0115734 A1 | 5/2009 | Fredriksson |
| 2009/0167704 A1 | 7/2009 | Terlizzi et al. |
| 2009/0174672 A1 | 7/2009 | Schmidt |
| 2009/0225046 A1 | 9/2009 | Kim |
| 2009/0242282 A1 | 10/2009 | Kim |
| 2009/0316380 A1 | 12/2009 | Armstrong |
| 2009/0322183 A1 | 12/2009 | Kawakubo |
| 2010/0107067 A1 | 4/2010 | Vaisanen |
| 2010/0141408 A1 | 6/2010 | Doy et al. |
| 2010/0149111 A1 | 6/2010 | Olien |
| 2010/0149124 A1 | 6/2010 | Kim |
| 2010/0164959 A1 | 7/2010 | Brown et al. |
| 2010/0182263 A1 | 7/2010 | Aunio et al. |
| 2010/0214239 A1 | 8/2010 | Wu |
| 2010/0225600 A1 | 9/2010 | Dai et al. |
| 2010/0245254 A1 | 9/2010 | Olien et al. |
| 2010/0328229 A1 | 12/2010 | Weber et al. |
| 2011/0096008 A1* | 4/2011 | Furukawa ............ G06F 3/0338 345/173 |
| 2011/0141052 A1* | 6/2011 | Bernstein ................ G06F 3/016 345/174 |
| 2011/0163985 A1 | 7/2011 | Bae et al. |
| 2011/0227872 A1* | 9/2011 | Huska ..................... G06F 3/016 345/174 |
| 2012/0013531 A1 | 1/2012 | Wilson |
| 2012/0038568 A1 | 2/2012 | Colloms et al. |
| 2012/0038577 A1 | 2/2012 | Brown et al. |
| 2012/0050230 A1 | 3/2012 | Harris |
| 2012/0062491 A1 | 3/2012 | Coni et al. |
| 2012/0105367 A1 | 5/2012 | Son et al. |
| 2012/0133496 A1 | 5/2012 | Aono |
| 2012/0139860 A1 | 6/2012 | Hotelling et al. |
| 2012/0154315 A1 | 6/2012 | Aono |
| 2012/0182238 A1 | 7/2012 | Lee |
| 2012/0229264 A1 | 9/2012 | Bosch et al. |
| 2012/0235942 A1 | 9/2012 | Shahoian et al. |
| 2012/0306798 A1* | 12/2012 | Zoller ..................... G06F 3/016 345/173 |
| 2012/0319987 A1 | 12/2012 | Woo |
| 2012/0320085 A1 | 12/2012 | Mei et al. |
| 2012/0326981 A1 | 12/2012 | Kurose |
| 2013/0057558 A1 | 3/2013 | Pu et al. |
| 2013/0076652 A1* | 3/2013 | Leung ..................... G06F 3/016 345/173 |
| 2013/0154933 A1 | 6/2013 | Sheik-Nainar |
| 2013/0179827 A1 | 7/2013 | Eriksson et al. |
| 2013/0198625 A1 | 8/2013 | Anderson et al. |
| 2013/0222267 A1 | 8/2013 | Almalki |
| 2013/0222289 A1 | 8/2013 | Kwak |
| 2013/0321290 A1 | 12/2013 | Oh |
| 2014/0028575 A1 | 1/2014 | Parivar et al. |
| 2014/0176485 A1 | 6/2014 | Holmberg et al. |
| 2014/0191973 A1 | 7/2014 | Zellers et al. |
| 2014/0197936 A1 | 7/2014 | Biggs et al. |
| 2014/0198071 A1 | 7/2014 | Algreatly |
| 2014/0341420 A1 | 11/2014 | Karkkainen et al. |
| 2014/0347289 A1 | 11/2014 | Suh et al. |
| 2015/0089435 A1 | 3/2015 | Kuzmin |
| 2015/0109223 A1 | 4/2015 | Kessler et al. |
| 2015/0116205 A1 | 4/2015 | Westerman et al. |
| 2015/0130730 A1 | 5/2015 | Harley et al. |
| 2015/0155474 A1 | 6/2015 | Tanimoto et al. |
| 2015/0177899 A1 | 6/2015 | Degner et al. |
| 2015/0192482 A1 | 7/2015 | Araki et al. |
| 2015/0227280 A1 | 8/2015 | Westerman et al. |
| 2015/0234493 A1 | 8/2015 | Parivar et al. |
| 2015/0242037 A1 | 8/2015 | Pedder et al. |
| 2015/0301642 A1 | 10/2015 | Hanaur et al. |
| 2015/0346881 A1 | 12/2015 | Watazu |
| 2016/0085355 A1 | 3/2016 | Pirogov et al. |
| 2016/0091972 A1 | 3/2016 | Patel et al. |
| 2016/0162031 A1 | 6/2016 | Westerman et al. |
| 2016/0188010 A1 | 6/2016 | Wright et al. |
| 2016/0233012 A1* | 8/2016 | Lubinski ................... H01F 7/12 |
| 2017/0268942 A1 | 9/2017 | Pedder et al. |
| 2018/0046307 A1 | 2/2018 | Wells et al. |
| 2019/0025926 A1 | 1/2019 | Harley et al. |
| 2019/0025954 A1* | 1/2019 | Wang ..................... G06F 3/041 |
| 2019/0073003 A1* | 3/2019 | Xu ........................ G06F 1/1673 |

FOREIGN PATENT DOCUMENTS

| | | |
|---|---|---|
| CN | 101482785 | 7/2009 |
| CN | 101523329 | 9/2009 |
| CN | 101763193 A | 6/2010 |
| CN | 101833393 | 9/2010 |
| CN | 101868770 | 10/2010 |
| CN | 102047088 | 5/2011 |
| CN | 102084325 | 6/2011 |
| CN | 102084328 | 6/2011 |
| CN | 102144205 | 8/2011 |
| CN | 102339166 | 2/2012 |
| CN | 102426490 | 4/2012 |
| CN | 102640093 | 8/2012 |
| CN | 1496549 | 10/2012 |

(56) References Cited

FOREIGN PATENT DOCUMENTS

| | | |
|---|---|---|
| CN | 102713805 | 10/2012 |
| CN | 102870080 | 1/2013 |
| CN | 103097990 | 5/2013 |
| DE | 102010007486 | 8/2011 |
| EP | 2077490 | 7/2009 |
| EP | 2202619 | 6/2010 |
| EP | 2320309 | 5/2011 |
| EP | 2357547 | 8/2011 |
| EP | 2375306 | 10/2011 |
| EP | 2381340 | 10/2011 |
| EP | 2395414 | 12/2011 |
| EP | 2648071 | 10/2013 |
| JP | 2007034991 | 2/2007 |
| KR | 101274123 | 6/2013 |
| KR | 20130109288 | 10/2013 |
| TW | 201314541 | 4/2013 |
| WO | WO 12/161061 | 11/2012 |
| WO | WO 13/169299 | 11/2013 |
| WO | WO 13/169303 | 11/2013 |
| WO | WO 13/169305 | 11/2013 |
| WO | WO 13/188307 | 12/2013 |
| WO | WO 14/017407 | 1/2014 |
| WO | WO 14/018111 | 1/2014 |
| WO | WO 15/020663 | 2/2015 |

OTHER PUBLICATIONS

"Immersion Announces MOTIV™ Development Platform for Android," retrieved from the Internet: URL:http://ir.immersion.com/releasedetail.cfm?sh_email=no&releaseid=549080, Feb. 10, 2011.

Pava et al., "Real Time Platform Middleware for Transparent Prototyping of Haptic Applications," 2004.

Technifast, "Blind Captive Nuts," Jun. 30, 2013, http://www.technifast.co.uk.

Zordan, Enrico et al., "Principle design and actuation of a dual chamber electromagnetic micropump with coaxial cantilever valves," Biomedical Microdevices, Kluwer Academic Publishers, BO, vol. 12, No. 1, Oct. 17, 2009, pp. 55-62.

Product Specification Sheet: GEEPLUS, VIBRO1 Vibration Actuator, 2 pages, www.geeplus.biz, downloaded on Jul. 15, 2015.

\* cited by examiner

HAPTIC ELECTROMAGNETIC ACTUATOR

CROSS-REFERENCE TO RELATED APPLICATIONS

The present application is a divisional of U.S. patent application Ser. No. 14/404,156, filed Nov. 26, 2014, entitled "Haptic Electromagnetic Actuator," which is a 35 U.S.C. 371 application of PCT/US2013/045011, filed Jun. 10, 2013, entitled "Haptic Electromagnetic Actuator," which claims the benefit of U.S. Provisional Application No. 61/658,764, filed Jun. 12, 2012, entitled "Haptic Electromagnetic Actuator," and U.S. Provisional Application No. 61/800,092, filed Mar. 15, 2013, entitled "Haptic Electromagnetic Actuator," the contents of which are incorporated by reference as if fully disclosed herein.

TECHNICAL FIELD

The present invention generally relates to an electromagnetic actuator for providing haptic feedback in a computing device, and more particularly to an electromagnetic actuator generating linear motion parallel to an input surface.

BACKGROUND

Haptics is a tactile feedback technology which pertains to the sense of touch by applying forces, vibrations or motions to a user. This mechanical stimulation may be used to provide tactile feedback in response to an input command or system state. Haptic devices may incorporate actuators that apply forces or motion to the skin for providing touch feedback. One example of a haptic actuator provides mechanical motion in response to an electrical stimulus. Most haptic feedback mechanisms use mechanical technologies such as vibratory motors, like a vibrating alert in a cell phone, in which a central mass is moved to create vibrations at a resonant frequency. The kinetic energy of these vibrations may be sensed by a user. These motors provide strong feedback, but produce a limited range of sensations.

There remains a need for developing actuators with flat shape, but sufficient travel distance or working distance and sufficient force and fast response.

SUMMARY

Embodiments described herein may provide a flat actuator which generates relatively large travel distance and high magnetic force. The disclosure provides methods for fabricating the actuator from a flat laminated metal sheet. Such fabrication methods may be cost effective and may provide the dimensional precision as needed.

In an embodiment, a haptic electromagnetic actuator for trackpad is provided. The actuator includes an array of electromagnets with alternating South and North poles on a first end, each magnet comprising a metal core and an electrical wire around the metal core. The array of magnets is coupled to a base plate on a second end opposite to the first end. The actuator also includes an attraction plate at a distance from the first end of the array of the magnets such that the attraction plate moves toward the magnets when an electrical current flows through the electrical wire around the metal core and moves away from the magnets when the current becomes zero. The array of magnets is configured to form a uniform gap from the attraction plate.

In another embodiment, a track pad is provided to include a haptic electromagnetic actuator. The track pad includes a housing, and a track plate coupled to the housing by bending beams. The track pad also includes an actuator having a baseplate coupled to the housing on a first end. The baseplate supports an array of electromagnets with alternating South and North poles on a second end opposite to the first end. The actuator has an attraction plate coupled to the track plate.

In a further embodiment, a method is provided for fabricating an actuator. The method includes providing a laminated sheet metal and stamping the sheet metal to an array of metal cores with a support base. The method also includes annealing the sheet metal. The method further includes placing electrical wires around the metal cores, and soldering two ends of each wire to the support base.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION

Figure 1:
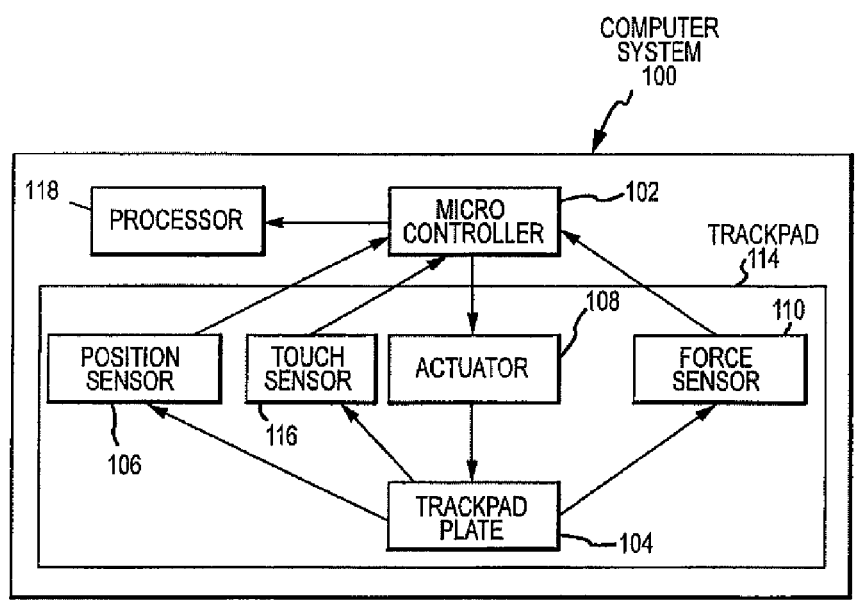
FIG. 1 illustrates a computer system in an embodiment.

The present disclosure may be understood by reference to the following detailed description, taken in conjunction with the drawings as briefly described below. It is noted that, for purposes of illustrative clarity, certain elements in the drawings may not be drawn to scale.

Generally, embodiments described herein may take the form of an actuator for providing a haptic output to a surface.

The actuator may provide the haptic output in response to an input signal or an output signal, or as part of an output signal. The actuator may vary its output in order to shape and control the haptic response and thus the sensation experienced by a user. In some embodiments, the actuator may be electromagnetically controlled. Embodiments described herein may be incorporated into a variety of electronic or electrical devices, such as a track pad, mouse, or other input (or output) device. Embodiments may likewise be incorporated into a variety of different electronic devices, including smart phones, tablet computing devices, portable computing devices, feedback or outputs for appliances, automobiles, and the like, touchscreens, and so on.

FIG. 1 illustrates a computer system in accordance with a sample embodiment. The computer system 100 includes a processing unit 118, a micro controller 102, and a trackpad 114. As shown in FIG. 1, the computer system includes a processing unit 118 and a microcontroller 102; however, in many embodiments, the functions of the microcontroller 102 as described herein may be implemented by the processing unit 118 and the microcontroller may be omitted. Accordingly, the term microcontroller 102 is meant to encompass a separate processing element from the processing unit or functionality performed by the processing unit 118 itself.

The track pad 114 includes a trackpad plate 104, at least one position sensor 106, at least one touch sensor 116, and at least one force sensor 110, as well as an actuator 108. Each of the touch sensor(s) 116, the position sensor(s) 106, the force sensor(s) 110 and the actuator 108 are coupled to the trackpad plate 104 and the micro controller 102 and/or processing unit 118. The computer system 100 typically further includes a display and one or more additional user interfaces (not shown). In some embodiments, the position sensor(s) 106 may be an accelerometer, motion sensor or the like.

One example of providing haptic feedback is now discussed, but it should be understood that this is a single example and not meant to be limiting. When using the trackpad 114 to provide input to the computer system 100, a user may move his or her finger on the trackpad plate 104 to, and/or touch the trackpad plate at, a desired location. The touch sensor(s) 116 and the force sensor(s) 110 detect the location and force of the touch on the trackpad plate 104 respectively and send corresponding signals to the micro controller 102. The micro controller 102 communicates with processing unit 118 inside the computer system 100; the processing unit 118 may generally instruct the micro controller with respect to certain operations.

The processing unit 118 may employ these signals to determine if the location of the touch correlates with a specific application or a user interface (UI) element. If the location is within the range for the specific application or UI element, the processing unit further determines if the force signal is above a threshold. If so, the processor may validate the force signal as a selection of the application of UI element. In other words, the force signal is not a false signal. The micro controller 102 then activates the actuator 108, which moves the surface of the trackpad beneath the user's finger (as described in more detail below). The user may sense this motion, thereby experiencing haptic feedback in response to the application or UI element selection. The position sensor 106 detects how much the trackpad plate 104 moves relative to the actuator after an actuation event, or vice versa.

In another example, the track pad 114 may detect a user input, such as a user touch or a user force. In this example, substantially any type of user input detected may be used to provide feedback to the user. Based on the user input the track pad 114 may be activated by the processing unit 118 to move or vibrate to provide haptic feedback to a user. In some instances, the user input may be correlated to a specific application or UI element, in which case the location of the user input may be analyzed to determine if feedback is desired. In other instances, the mere reception of a user input may be sufficient to initiate haptic feedback.

It should be noted that haptic feedback may be provided in response not only to a user input, an example of which is provided above, but also in response to system operation, software status, a lack of user input, passage of user input over UI elements(s) (e.g., dragging a cursor over a window, icon, or the like), and/or any other operating condition of the computer system 100.

Figure 2A:
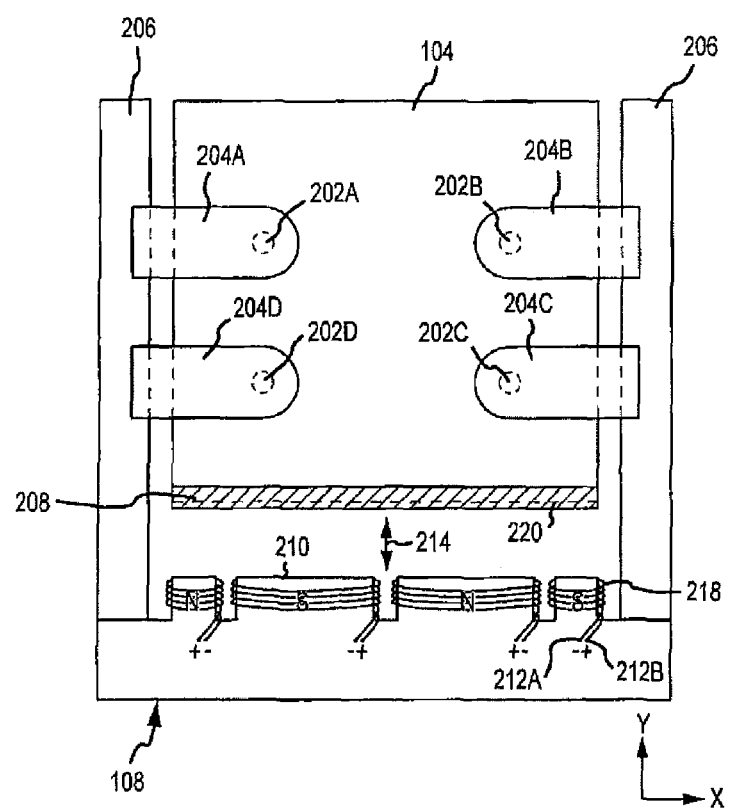
FIG. 2A illustrates a bottom view of a trackpad with an electromagnetic actuator in an embodiment.

FIG. 2A illustrates a bottom view of the trackpad plate 104 coupled to bending beams and the actuator 108 in accordance with an example embodiment. As illustrated, the trackpad plate 104 is supported by four bending beams 204A-D and coupled through gels 202A-D. The gels 202A-D allow relative movements or lateral motion of the trackpad plate 104 with respect the bending beams 204A-D that are attached to a housing 206. An attraction plate 208 is attached to the trackpad plate 104 near an edge 220 of the trackpad plate 104 and has a rectangular or a square shape in this embodiment. More specifically, in this embodiment, the attraction plate 208 is substantially parallel to the edge 220 of the trackpad plate 104. In some embodiments, the actuator 108 may be attached to the housing 206, and may be located outside of, and approximately adjacent to, an edge 220 of the trackpad plate 104. In other embodiments, the actuator 108 may be attached to a bending beam plate rather than the housing. Note that edge 220 is shown in dash lines in this embodiment. The attraction plate 208 can slightly extend from the edge 220 of the trackpad plate 104. Positioning of the attraction plate 208 and the actuator 108 may affect the overall operation of the embodiment.

The gap 214 between the attraction plate and the actuator may be tightly controlled, since the force exerted by the actuator on the attraction plate drops with an increase in the gap distance. In some embodiments, the gap 214 may be controlled to equal 300 μm+/−50 μm, although this distance may vary between embodiments. It may be useful to place the attraction plate and the actuator in the same X-Y plane to prevent or reduce inducing torque or pitch-type motion in the trackpad plate. Similarly, aligning the actuator and attraction plate along the x axis may help reduce or prevent torquing of the trackpad plate in-plane, as well as yaw motion. In some embodiments, the actuator may be attached to one or more bending beams in addition to, or instead of, the housing.

The actuator 108 includes a number of metal cores or tines or arms 210, each metal core or tine being wound with a wire 218. The metal cores may be magnetized when an electric current goes through the wire and electrical contacts 212A-B. Essentially, the combination of cores and wires forms a series of electromagnets. The processing unit and/or the microcontroller 102 may activate the actuator 108 by flowing the electric current through the wire 218, and deactivate the actuator 108 by reducing the electric current to zero. When the actuator 108 is activated by the controller 102, the attraction plate 208 is attracted to poles 210 of the actuator 108 and moves toward the poles 210 such that the trackpad plate 104 moves toward the actuator 108 from its original position.

When the actuator 108 is deactivated by reducing the electric current to zero, the attraction plate 208, along with the trackpad plate 104, is biased away from the actuator 108 such that it returns to its original position. In the present embodiment, the gel(s) may act as a spring, returning the trackpad plate 104 to its original position when the attractive force of the haptic actuator 108 terminates. It should be appreciated that other biasing elements may be used instead of the pictured gels. For example, a spring may be used instead, as may other elastic materials.

In a particular embodiment, the wires for each metal core or tine 210 may be positioned on either side of the metal core. The contacts 212A-B are all connected to a printed circuit board (PCB) (not shown) that may have connections to a specialized circuit board, such as an input device board. Electric current is provided to the wires through the two connections on the PCB. The PCB may attach to a support base.

Typically, movement of the track pad plate 104 is in the plane of the track pad, that is, lateral or in-plane movement. The movement of the trackpad gives the user's finger a sensation or a feedback. The sensation generated by such a back and forth movement is different from a sensation from a typical vibration as used in a cell phone. The sensation generated by the actuator 108 may be more forceful and abrupt than the sensation resulting from vibration induced by an off-center motor or other mechanical actuators.

Figure 2B:
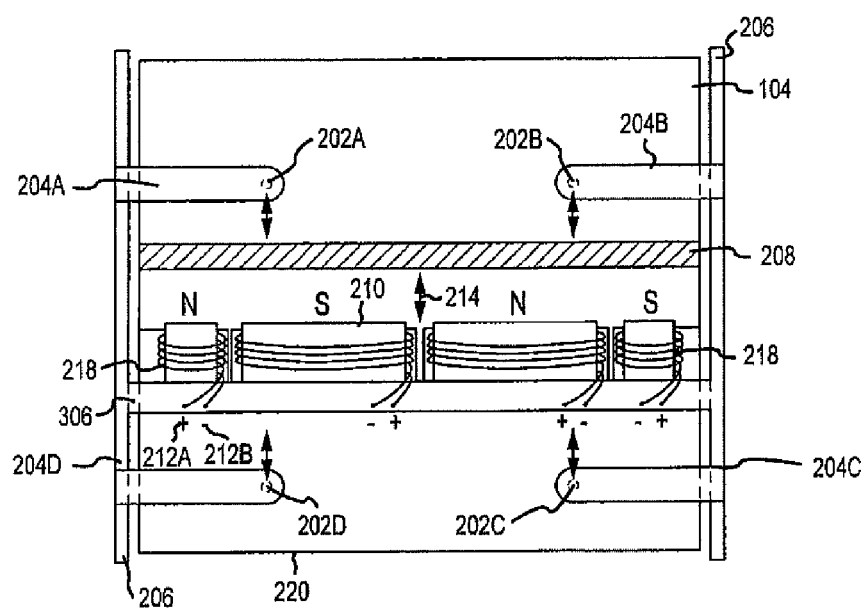
FIG. 2B illustrates a bottom view of a trackpad with an electromagnetic actuator in another embodiment.

FIG. 2B illustrates a bottom view of the trackpad plate 104 with the electromagnetic actuator 108 in accordance with another embodiment. The main differences between the embodiments of FIG. 2B and FIG. 2A are the locations of the attraction plate and the actuator under the trackpad plate. As shown, the trackpad plate 104 is supported by four bending beams 204A-D and coupled through the gels 202A-D. The attraction plate 208 is attached to the trackpad plate 104 within the trackpad. More specifically, the attraction plate 208 is substantially parallel to the edge 220 of the trackpad plate 104 and offset from the edge. The actuator 108 may be located beneath the trackpad plate 104, but is attached to the housing 206 and not the trackpad plate. The support base 306 for the actuator 108 may extend to the housing 206 under the trackpad plate 104. The actuator 108 may not attach to the track pad plate 104, or may attach to a bending beam or bending beam plate associated with the bending beam(s). Additionally, the track pad plate 104 is supported by four bending beams 204A-D through joints or gels 202A-D. The four bending beams are attached to housing 206.

Figure 3A:
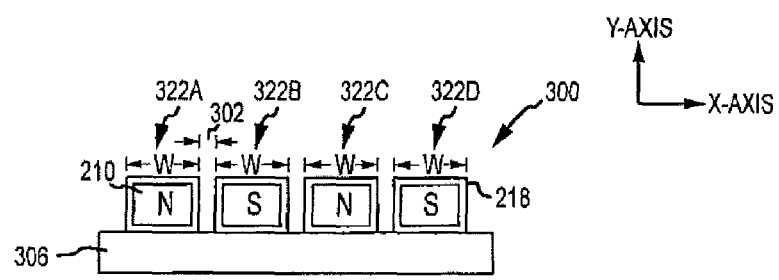
FIG. 3A illustrates a side view of the electromagnetic actuator in an embodiment.

FIG. 3A illustrates a side view of the electromagnetic actuator 108 in an embodiment. As shown, the actuator 300 includes four alternating magnetic poles or tines 322A-D, shown as alternating north (N) and south (S) poles. It should be appreciated that alternative embodiments of the actuator may use different patterns of poles. Each of poles 322A-D is formed from a metal core 210 and layers of electric wires 318 that are wound around the metal core 210. In the current embodiment, the metal core 210 has a generally rectangular cross-section. The four poles 322A-D are aligned along an X-axis and attached to a support base 306. There is a gap 302 between each pair of poles 322N and 322S. All the poles 322A-D have the same width "w" in this configuration, although in other embodiments the widths of any or all of the poles may be different. The use of a configuration of alternating pole polarity (e.g., north-south-north-south (NSNS) or south-north-south-north (SNSN)) for the actuator allows the use of an additional third central flux loop that is not present in certain other polarity configurations, such as north-south-south-north (NSSN) or south-north-north-south (SNNS). This allows larger force to be generated. Similarly, certain pole polarity configurations, such as north-north-south-south (NNSS) and south-south-north-north (SSNN), have one flux loop, which results in lower force, presumably due to a longer flux path.

The metal core 210 and the attraction plate 208 may be made of a relatively soft magnetic material, such as iron or steel. The soft magnetic material has a small hysteresis loop and a small coercive force as well as a small remanence such that no magnetism remains when the magnetic field is removed. In the actuator, the external magnetic filed is generated by the electric current. In a sample embodiment, the metal core 210 may be made of silicon steel. The attraction plate may be formed from iron or another suitable material. Generally, silicon steel has a higher magnetic saturation limit and a better magnetic permeability than iron or many other ferrous materials, may help improve efficiency of the system. That is, more flux may be produced with the same electric current. The material for the attraction plate may vary with the dimension of the attraction plate. For example, for a relatively thin attraction plate, silicon steel may be used. For a relatively thick plate, electrical iron 430 or even electrical iron 1010 may be used without saturation under normal operating conditions.

Figure 3B:
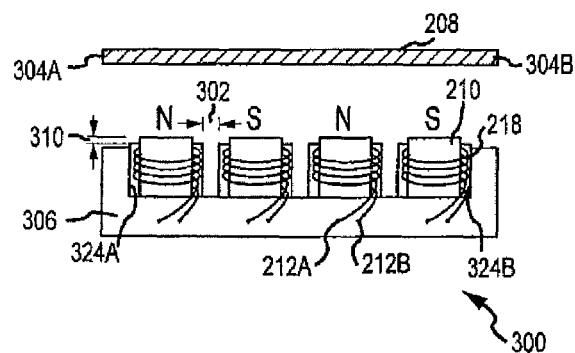
FIG. 3B illustrates a top view of the electromagnetic actuator of FIG. 3A.

FIG. 3B illustrates a top view of the electromagnetic actuator of FIG. 3A. The wires 218 are wound around the metal core 210 and leave a space 310 near the top end of the pole. The bottom end of each pole is attached to the support base 306. Electrical contacts 212A-B for the wires 218 are also attached to the support base 306. The attraction plate 208 has two ends 304A and 304B, each of which are aligned with the two ends 324A-B of the support base 306. In the current embodiment, the length of the attraction plate 208 is equal or longer than the two ends 324A-B of the poles. This may facilitate a uniform magnetic field across the attraction plate 208.

Figure 4A:
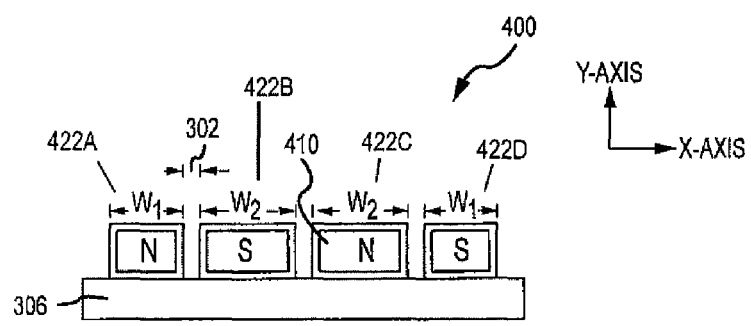
FIG. 4A illustrates a side view of the electromagnetic actuator in another embodiment.
Figure 4B:
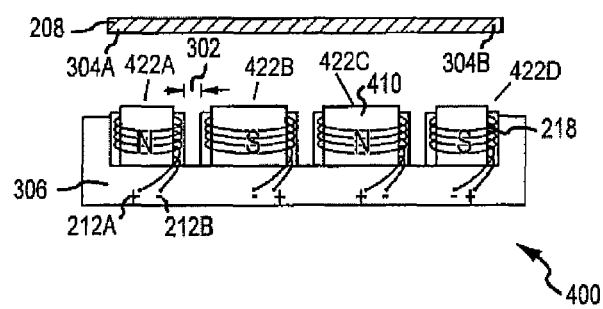
FIG. 4B illustrates a top view of the electromagnetic actuator of FIG. 4A.
Figure 4C:
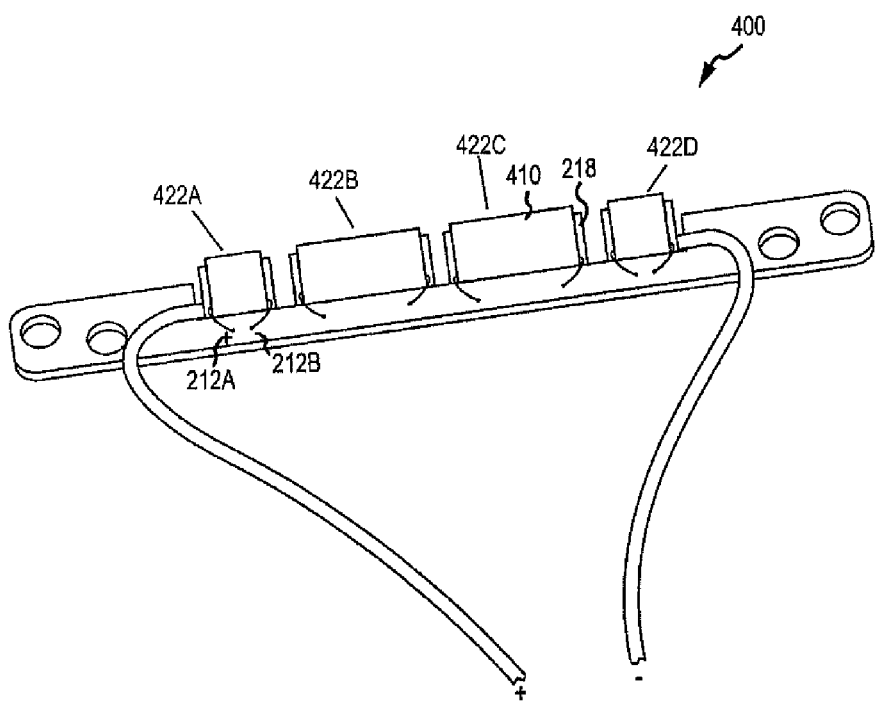
FIG. 4C is a perspective view of the actuator of FIGS. 4A and 4B.

FIG. 4A illustrates a side view of the electromagnetic actuator in another embodiment. In this embodiment, actuator 400 includes four alternating magnetic poles 422A-D with different pole widths. For example, the outer poles 422A and 422D have a smaller pole width "$W_1$" than the width "$W_2$" of inner poles 422B and 422C. This variation in pole width in the actuator 400 helps form a more uniform magnetic field across the attraction plate than the actuator 300. FIG. 4B illustrates a top view of the electromagnetic actuator of FIG. 4A. FIG. 4C is a perspective view of the actuator 400. Note that the figures are not to scale. The magnetic poles may include metal cores 410. The inner poles or tines are wider than the outer poles or tines, which prevents saturation of the inner tines due to the presence of the third flux loop in a NSNS or SNSN pole configuration. Additional benefits include preventing in-plane twisting of the trackpad plate from occurring, since higher force is generated over these central poles or tines.

The metal core 210 may have a rectangular shape as shown in FIGS. 3A and 4A. In alternative embodiments, any or all metal cores 210 may be square in cross-section instead. The metal core also may be a cross-section of a square with rounded edges. The core's cross-section also may be circular. It will be appreciated by those skilled in the art that the metal core may vary in shape and dimension. Each shape has an aspect ratio of cross-sectional area per unit circumference. Higher aspect ratios result in lower electrical coil resistances for the same surface area.

Figure 5A:
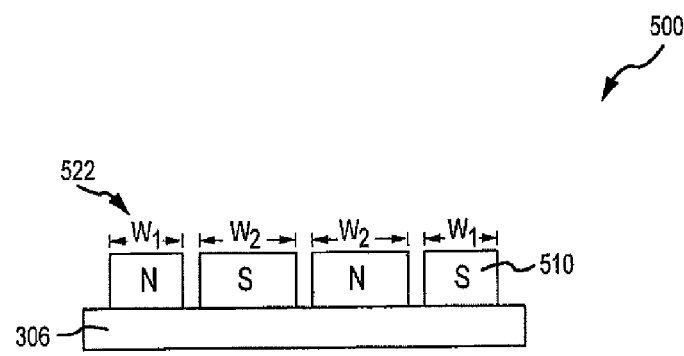
FIG. 5A illustrates a side view of the electromagnetic actuator in an alternative embodiment.
Figure 5B:
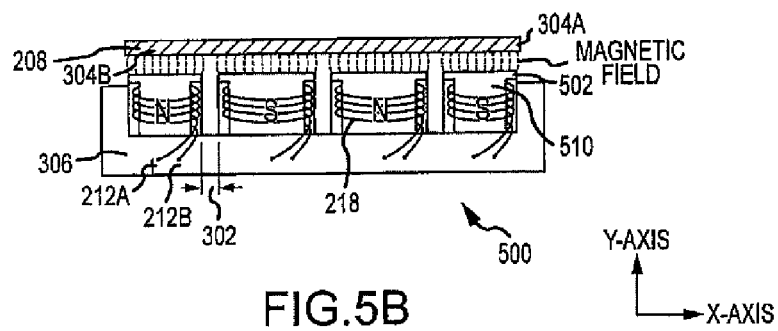
FIG. 5B illustrates a side view of the electromagnetic actuator of FIG. 5A.

FIG. 5A illustrates a side view of the electromagnetic actuator in an alternative embodiment. FIG. 5B illustrates a top view of the electromagnetic actuator of FIG. 5A. In this embodiment, actuator 500 includes four alternating magnetic poles 522 with two different pole widths "$W_1$" and "$W_2$", similar to actuator 400. However, each metal core 510 terminates in a plate 502. The plate 502 extends from the metal core 510 to each side, thereby constraining the wires between the plate 502 and the support 306. This plate 502 helps increase magnetic force by about 10%. As the plate 502 extends sideway, the magnetic field near the ends 304A-B of the attraction plate 208 may be stronger for the actuator 500 than that for the actuator 400. The reduced edge effects may help increase the magnetic force. As an example, W1 is 6.35 mm, W2 is 12.85 mm, a gap between two tines is 2.5 mm to allow space for the wire. A gap between the outer tine and edge is 1.75 mm to allow space for the wires. The tine or arm has a height of 6.65 mm.

Figure 6A:
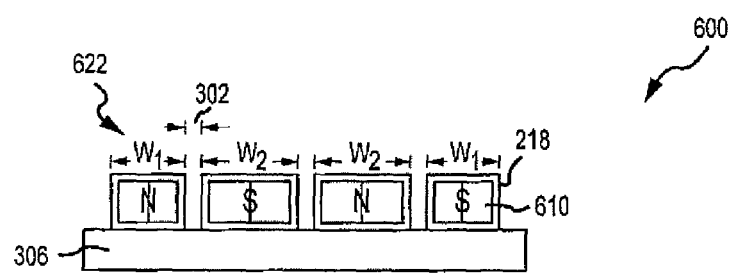
FIG. 6A illustrates a side view of the electromagnetic actuator in a further embodiment.
Figure 6B:
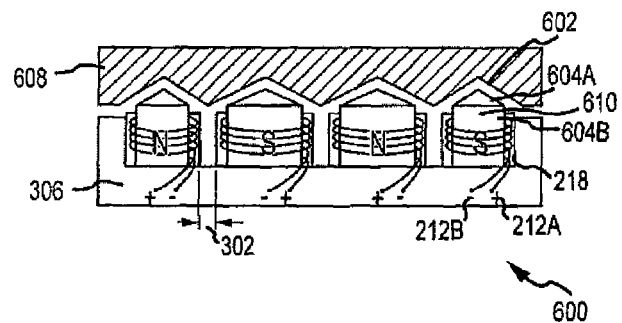
FIG. 6B illustrates a top view of the electromagnetic actuator of FIG. 6A.

FIG. 6A illustrates a side view of the electromagnetic actuator in a further embodiment. FIG. 6B illustrates a top view of the electromagnetic actuator of FIG. 6A. In this particular embodiment, actuator 600 includes four alternating magnetic poles 622 with two different pole widths "$W_1$" and "$W_2$". However, unlike actuator 400, actuator 600 may have a triangular portion or crown 604A on top of the otherwise rectangular metal core body 604B, such that the metal core 610 has a cross-section equal to the addition of the triangular portion 604A and the rectangular body 604B. The triangular portion 604A of the metal core 610 changes relationship between a magnetic force and the distance between the attraction plate and the poles. For example, without the triangular portion 604A, the magnetic force may increase non-linearly with decreasing distance between attraction plate and the poles. With the triangular portion added to the metal core, the force may increase less non-linearly with decreasing distance between the attraction plate and the poles. It will be appreciated by those skilled in the art that the triangular portion 604A may vary in shape.

The attraction plate 608 has a series of recesses contoured by edge 602. Each recess may be matched to the shape of the triangular portion 604A of the actuator 600 such that equal spacing is formed between the attraction plate 608 and the actuator 600.

Although the examples in FIGS. 2-6 show the use of four poles, the number of poles may vary with the dimension of the poles and the dimension of the trackpad. For example, the number of poles may increase with the dimension of the trackpad and may decrease with the width of the pole.

For both actuators 300 and 400, assuming that the gap 302 remains the same and the total distance between the two ends 324A and 324B of the actuator are the same except the pole width variation, the integrated magnetic force is about the same. However, the magnetic field distribution across the X-axis is more uniform for actuator 400 with different pole widths than that for actuator 300 with constant pole width.

Figure 7:
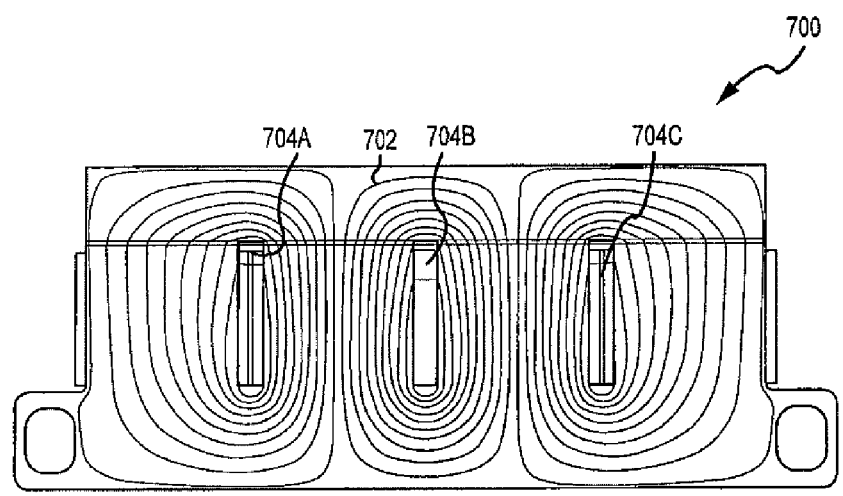
FIG. 7 illustrates simulated magnetic flux field for actuator of FIGS. 3A and 3B in an embodiment.

FIG. 7 illustrates simulated magnetic field 700 for the actuator of FIGS. 3A and 3B in accordance with that embodiment. For actuator 300, the magnetic field is not uniform across the X-axis. Specifically, the magnetic field lines 702 are closer in the middle section 704B than the outer section 704A and 704C. In this simulation, the total force along the Y-axis is 20.12 N and along the X-axis is 0.02 N, given that the gap between the attraction plate and the actuator is 350 μm. The electric current is 3 amperes. There are three layers of wire; each layer has 30 turns such that there is a total of 90 turns for all the three layers. The wire has a 34 American Wire Gage (AWG) diameter.

Figure 8:
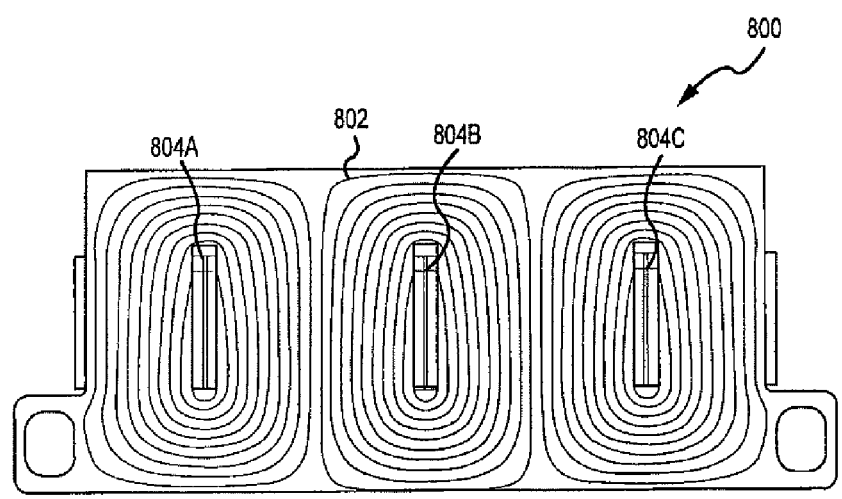
FIG. 8 illustrates simulated magnetic flux field for actuator of FIGS. 4A and 4B in an embodiment.

In contrast, FIG. 8 illustrates a sample and simulated magnetic field for the actuator of FIGS. 4A and 4B. For actuators 400, 500, 600, the magnetic fields are more uniform. Particularly, magnetic field lines 802 are uniformly spaced for regions 804A-C.

It will be appreciated by those skilled in the art that the number of turns of the wires may vary, and the number of layers of the wires, the wire diameter, and the height of the metal core may vary.

As illustrated in some embodiments, the actuator is flat and small in height, which is suitable for use in small and thin portable computer devices, such as notebook computers, tablet devices, music and media devices and smart phones. The actuator also has a relatively high magnetic force to attract a attraction plate to move forward and back quickly. The actuator may also have a uniform magnetic field from one end to the other end across the attraction plate.

The actuator can be constructed as a single unit from a laminated sheet metal. The metal cores are formed by stamping to remove some material to form spaces between each core from the laminated sheet metal. The laminated sheet metal is stamped to form an integral support 306 for a series of metal cores. The series of metal cores is not attached to the support 306. Such a layered unit construction method for the actuator may increase dimensional precision of each pole and reduces the need for integration of different components which are fabricated separately. The number of poles may be optimized for efficiency versus working distance. In a particular embodiment, the number of poles is four. Such a fabrication process is relatively low cost, as the actuator is made from a flat laminated metal. Commercially, high performance steel sheets are available. The metal sheets may be cut into the desired pattern.

Figure 9:
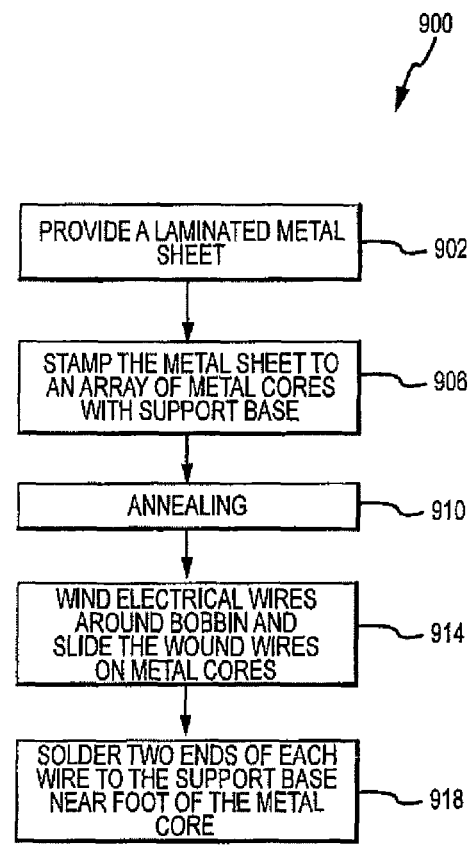
FIG. 9 is a flow chart illustrating steps for fabricating the actuator in an embodiment.

FIG. 9 is a flow chart illustrating sample steps for fabricating the actuator in accordance with an embodiment. Method 900 starts with providing a laminated metal sheet at operation 902, and is followed by stamping the metal sheet into a desired pattern of an array of metal cores at operation 906. Method 900 continues with annealing at operation 910. Annealing may help improve the permeability characteristics of the metal cores. It may better align magnetic domains after mechanical processing such as stamping may have misaligned the magnetic domains, especially around the edges and corners of the metal cores.

Method 900 may also include winding electrical wires around a bobbin and sliding the wound wires on the metal cores at operation 914. Method 900 further includes soldering two ends of each wire to a printed circuit board (PCB) on a support base at operation 918.

Figure 10:
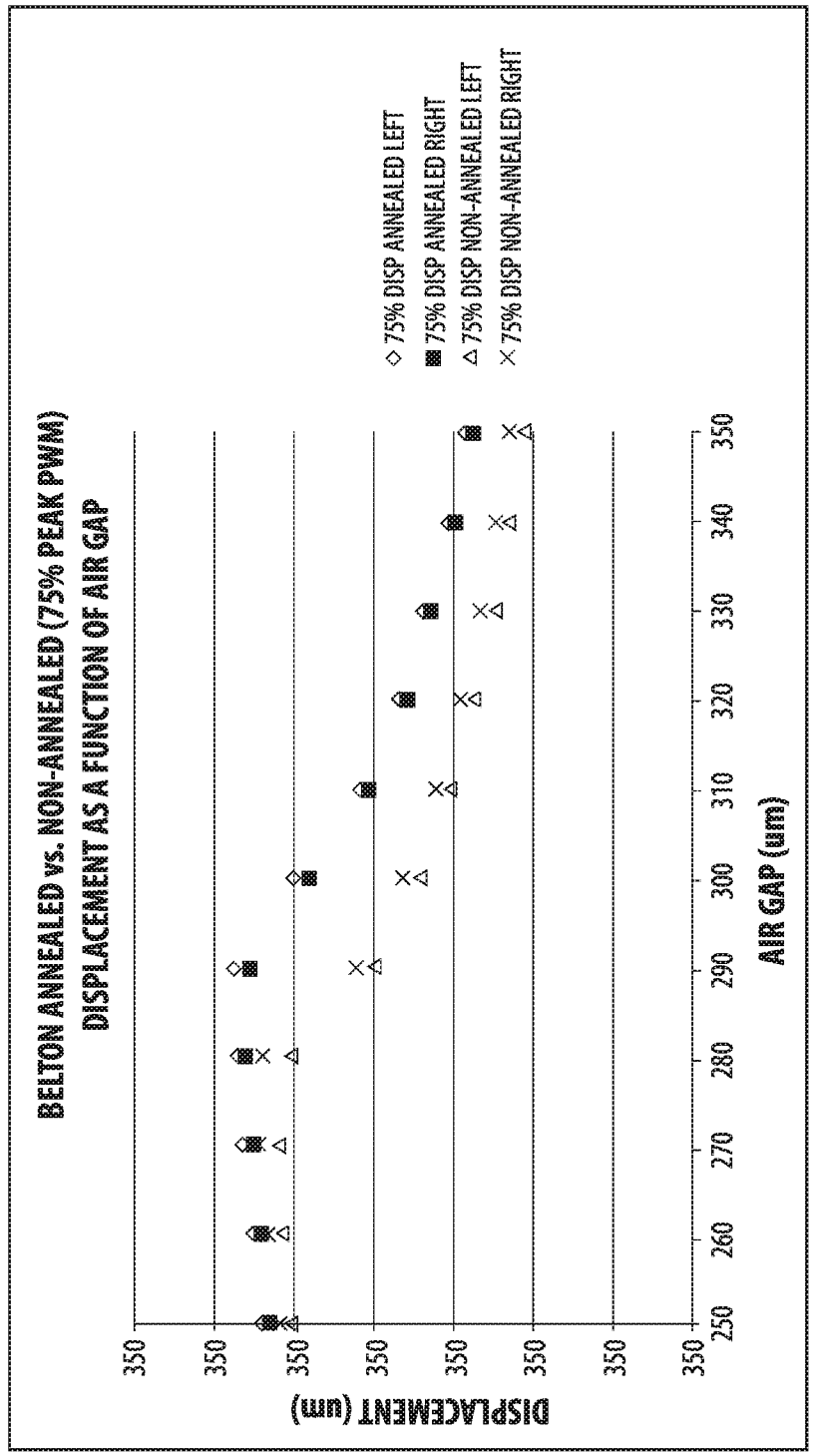
FIG. 10 illustrates a comparison of displacement versus gap for annealed and non-annealed actuators in an embodiment.

FIG. 10 illustrates a comparison of displacement versus gap for annealed and non-annealed actuators in an embodiment. As shown, data for annealed actuators show larger displacements than data for non-annealed actuators for large gaps. For example for air gap of 350 μm, annealed actuators have displacement of about 150 μm while non-annealed actuators have displacements of 110 μm. For smaller gaps, annealing does not affect the displacement to any great degree.

This layered unit construction also may reduce eddy currents that may otherwise be generated in the actuator. Potential benefits of reducing the eddy current include reducing heat generation and increasing power efficiency for the actuator.

To wind the wire on the metal core, the wire may be first wound on a bobbin. Then, the wound wire slides on the metal core. The wire is heated as the wire is wound on the bobbin, so that various turns are glued to each other to provide better packing.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A device, comprising:
   a plate defining a haptic output surface on an exterior of the device;
   an attraction plate attached to a surface of the plate opposite the haptic output surface, the attraction plate extending under the plate; and
   a haptic electromagnetic actuator extending under the plate and comprising an array of electromagnets positioned along an axis parallel to the haptic output surface; wherein:
   the array of electromagnets comprises alternating poles along the axis;
   each electromagnet comprises a metal core and an electrical wire around the metal core;
   the attraction plate is biased to maintain a gap between the attraction plate and the array of electromagnets; and
   the array of electromagnets is configured to overcome the bias and move the attraction plate toward the array of electromagnets, in a plane parallel to the plate, when an electrical current flows through each electrical wire around each metal core.

2. The device of claim 1, wherein the plate comprises a trackpad plate.

3. The device of claim 2, further comprising:
   a housing;
   a set of bending beams coupled to the housing; and
   a set of gels on the bending beams; wherein:
   the trackpad plate is positioned on the set of gels and supported by the bending beams.

4. The device of claim 3, wherein the haptic electromagnetic actuator is coupled to at least one bending beam in the set of bending beams.

5. The device of claim 1, wherein a first edge of the attraction plate adjacent the gap is substantially parallel to a second edge of the plate.

6. The device of claim 1, wherein each of the electromagnets is coupled to a base plate at a first end.

7. The device of claim 6, wherein each of the electromagnets defines a pointed end opposite the first end.

8. The device of claim 7, wherein the attraction plate defines a sawtooth shape, the sawtooth shape comprising a plurality of projections.

9. The device of claim 8, wherein each of the plurality of projections is received between at least two electromagnets.

10. An input device, comprising:
    a plate defining a plane;
    an attraction plate coupled to the plate, the attraction plate extending under the plate;
    an actuator operatively connected to the attraction plate and extending under the plate, the actuator comprising an array of solid core electromagnets arranged linearly on an axis parallel to the plane, with pole faces of each electromagnet in the array of electromagnets oriented to face the attraction plate;
    a force sensor operatively connected to the plate;
    a touch sensor operatively connected to the plate; and
    a controller operatively connected to at least one of the touch sensor, the actuator, and the force sensor; wherein
    the controller is configured to actuate the actuator, causing movement of the attraction plate and the plate to provide a haptic feedback at the plate in response to an input to the force sensor.

11. The input device of claim 10, wherein the plate is a track pad plate.

12. The input device of claim 10, further comprising:
    a position sensor operatively connected to the plate; wherein
    the position sensor is operative to detect a motion of the plate.

13. The input device of claim 12, wherein the controller is operative to actuate the plate to provide the haptic feedback in response to a signal from the controller.

14. The input device of claim 12, wherein the position sensor is operative to detect a motion of the plate relative to the actuator.

15. The input device of claim 12, wherein the position sensor comprises an accelerometer.

16. The input device of claim 10, wherein the force sensor is operative to determine an approximate force exerted on the plate.

17. The input device of claim 16, wherein the touch sensor is operative to determine a location at which a touch is present on the plate.

18. The input device of claim 17, wherein the controller is operative to correlate the approximate force with the location.

19. The input device of claim 10, wherein the plate moves in-plane when moved by the actuator.

20. The input device of claim 19, wherein the plate moves laterally with respect to the actuator.

* * * * *